United States Patent
Haertel et al.

(10) Patent No.: US 9,481,042 B2
(45) Date of Patent: Nov. 1, 2016

(54) RING-SHAPED TOOL FOR PROCESSING A WORK PIECE

(71) Applicant: Meiko Haertel, Ennepetal (DE)

(72) Inventors: Meiko Haertel, Ennepetal (DE); Helmut Sprenger, Ennepetal (DE)

(73) Assignee: Meiko Haertel, Ennepetal (DE)

( * ) Notice: Subject to any disclaimer, the term of this patent is extended or adjusted under 35 U.S.C. 154(b) by 0 days.

(21) Appl. No.: 14/439,785

(22) PCT Filed: Oct. 7, 2013

(86) PCT No.: PCT/EP2013/070755
§ 371 (c)(1),
(2) Date: Apr. 30, 2015

(87) PCT Pub. No.: WO2014/072134
PCT Pub. Date: May 15, 2014

(65) Prior Publication Data
US 2015/0258618 A1    Sep. 17, 2015

(30) Foreign Application Priority Data
Nov. 7, 2012    (DE) .................. 10 2012 220 246

(51) Int. Cl.
*B23C 5/08* (2006.01)
*B23C 3/28* (2006.01)
(Continued)

(52) U.S. Cl.
CPC . *B23C 5/14* (2013.01); *B23C 5/08* (2013.01); *B23C 3/12* (2013.01); *B23C 3/28* (2013.01);
(Continued)

(58) Field of Classification Search
CPC ............. B23C 5/08; B23C 5/14; B23C 3/12; B23C 3/122; B23C 3/124; B23C 3/126; B23C 3/28; B23C 2210/0435; B23C 2210/084; B23C 2240/16; Y10T 407/1964
USPC .......................................................... 83/853
See application file for complete search history.

(56) References Cited

U.S. PATENT DOCUMENTS

| 56,033 A | 7/1866 | Frost |
| 274,860 A * | 3/1883 | Vivarttas .................. B23F 21/14 407/29 |

(Continued)

FOREIGN PATENT DOCUMENTS

| CN | 2011 40295 | 10/2008 |
| DE | 93 16 953 | 5/1994 |

(Continued)

OTHER PUBLICATIONS

EPO, International Search Report, PCT/EP2013/070755, Jan. 17, 2014.

(Continued)

*Primary Examiner* — Sunil K Singh
*Assistant Examiner* — Ryan Rufo
(74) *Attorney, Agent, or Firm* — Richardt Patentanwalte PartG m

(57) ABSTRACT

The disclosure relates to a ring-shaped tool for processing a work piece, wherein the tool has a fastening area for fastening onto a rotatable drive shaft, wherein the fastening area is centered with relation to the ring-shape of the tool, wherein the tool further has sprockets arranged around the circumference of the tool, wherein the sprockets are arranged on the head end of the tool, wherein the sprockets have an arc-shape seen in axial direction of the ring, the arc-shape having a summit, wherein the sprockets are formed in a mirror-symmetric manner relative to the ring surface of the tool which is cutting through the summit.

15 Claims, 2 Drawing Sheets

(51) Int. Cl.
*B23C 5/14* (2006.01)
*B23C 3/12* (2006.01)
(52) U.S. Cl.
CPC ...... *B23C 2210/084* (2013.01); *B23C 2240/16* (2013.01); *Y10T 407/1964* (2015.01); *Y10T 409/303752* (2015.01); *Y10T 409/306552* (2015.01)

(56) References Cited

U.S. PATENT DOCUMENTS

| | | | | |
|---|---|---|---|---|
| 706,013 | A * | 8/1902 | Boyce | A61C 3/02 407/62 |
| 2,658,260 | A * | 11/1953 | Hage | B23C 5/08 407/61 |
| 3,283,663 | A * | 11/1966 | Davis | B23C 3/28 407/56 |
| 3,678,554 | A * | 7/1972 | Ezhov | B23C 5/14 407/115 |
| 6,129,488 | A * | 10/2000 | Fahr | B23B 5/16 30/97 |
| 6,684,742 | B1 * | 2/2004 | White | B23C 5/10 82/1.11 |
| 7,097,540 | B1 * | 8/2006 | Gosinski | B24B 19/14 29/558 |
| 2005/0186036 | A1 * | 8/2005 | Doerfel | B23C 3/32 407/31 |
| 2008/0118313 | A1 * | 5/2008 | Jonsson | B23C 5/10 407/42 |
| 2008/0206007 | A1 * | 8/2008 | Hughes | B23C 3/30 409/51 |
| 2011/0118054 | A1 * | 5/2011 | Johnson | A63B 53/047 473/331 |
| 2014/0010606 | A1 * | 1/2014 | Sagstrom | B23C 5/08 407/51 |

FOREIGN PATENT DOCUMENTS

| | | | |
|---|---|---|---|
| DE | 199 29 201 | 1/2001 | |
| DE | 103 16 371 | 11/2004 | |
| DE | 10 2004 027 032 | 12/2005 | |
| GB | 2 354 728 | 4/2001 | |
| JP | 04-256514 A * | 9/1992 | ............ B23C 5/22 |
| JP | 2005 334 981 | 12/2005 | |
| JP | 2010-058209 A * | 3/2010 | ............ B23F 21/14 |
| WO | WO 03/070409 | 8/2003 | |
| WO | WO 2011/136275 | 11/2011 | |
| WO | WO 2011/136275 A1 * | 11/2011 | ............ B23C 5/08 |
| WO | WO 2014/104245 A1 * | 7/2014 | ............ B23C 5/08 |

OTHER PUBLICATIONS

WIPO, International Preliminary Report on Patentability, PCT/EP2013/070755, May 21, 2015.

* cited by examiner

RING-SHAPED TOOL FOR PROCESSING A WORK PIECE

PRIORITY CLAIM

This application claims benefit of foreign priority in accordance with 35 U.S.C. 119(b) to German application No. 10 2012 220 246.3 filed Nov. 7, 2012.

BACKGROUND

The disclosure relates to a ring-shaped tool for processing a work piece as well as a method for using such a tool especially for opening a welded joint.

To excavate material from a work piece milling cutters are known in the prior art. Such milling cutters are operable to immerge into the work piece and excavate material. A disadvantage of such a milling cutter is that these are not suitable for use with manually operable machinery. This is especially valid if the material to excavate is comprised in a welded joint which is meant to be excavated or opened. The reason for this is the massive hardness of the material at the area of the welded joint.

DE 93 16 953 A1 discloses a cutting tool for milling slits, the tool consisting of a carrier rotating around an axis, the carrier having segment elements which are arranged around its circumference and protrude from the carrier. The segment elements are circle-shaped, U-shaped or V-shaped.

The DE 103 16 371 A1 discloses a profile cutter having a base body which is connectable to a control rod as a carrier for a plurality of cutting tips which are arranged around the circumference of the base body and are affixed thereto in an exchangeable manner using a clamping device comprising clamping screws and clamping surfaces.

The DE 199 29 201 C2 discloses a tool for chip-removing processing of at least one work piece with a centric clamping area for mounting to a driving element and with a ring-shaped working area having sprockets arranged around the circumference of the working area for processing the work piece, wherein the sprockets are spherically formed in the working area.

WO 2011/136 275 A1 and WO 2003/070 409 A1 disclose a circular type cutting disc. DE 10 2004 027 032 A1 discloses a material-removing tool especially a milling cutter for disconnecting welded joints especially laser welded joints on auto body sheets comprising a cutter wheel characterized in that at least on one side of the cutting disc at least one spacer disc is arranged having a smaller radius than the material removing part of the cutter wheel.

BRIEF DESCRIPTION OF THE DRAWINGS

In the following embodiments of the disclosure will be described with reference to the drawings in which.

DESCRIPTION

Figure 1:
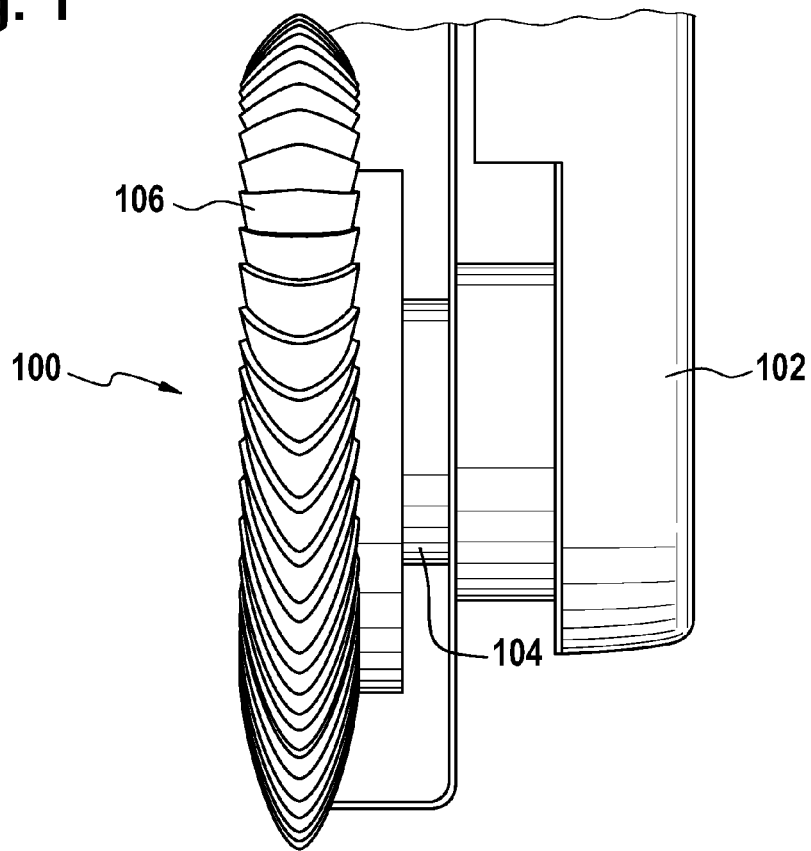
FIG. 1 is a perspective view of a tool having driving means.

In contrast thereto it is an object of the present disclosure to provide an improved tool for processing of a work piece as well as a method for using such a tool.

This objective is solved with the features of the independent patent claims. Embodiments of the disclosure are given in the dependent claims.

A ring-shaped tool especially for the chip removing processing of a work piece is provided wherein the tool has a fastening area for fastening onto a rotatable drive shaft, wherein the fastening area is centered with relation to the ring shape of the tool, wherein the tool further has sprockets arranged around the circumference of the tool, wherein the sprockets are arranged on the head end of the tool, wherein the sprockets have an arc shape seen in axial direction of the ring, the arc shape having a summit, wherein the sprockets are formed in a mirror-symmetric manner relative to the ring surface of the tool, which is cutting through the summit.

Embodiments may have the advantage that they allow for a manual operation of the tool during immerging and chip-removing processing of a work piece. Because of the arc shape the tool first encounters the work piece only with a minimal contact area resulting in a minimization of the forces effected onto the work piece by the tool.

In some embodiments of the disclosure the sprockets extend at least partially from the head end of the tool over the front edge of the tool. This may have the advantage that on the one hand the contact area of the tool with the work piece increases continuously up to a point defined by the geometry of the tool. The force effected onto the work piece by the tool therein increases continuously and controllably such that the tool may continuously be operated manually. On the other hand a corresponding geometry may cause the sprockets arranged on the front edge of the tool to continuously convey material which is cut off to the side of the work piece. As a result no hold up of material evolves and the surface which is processed with the tool will be excavated in a flatter and more even manner. This is especially relevant if a channel is created by the material which is cut off, wherein the channel is supposed to be filled with a welded joint subsequently.

In accordance with the disclosure the arc shape is given by two circles which tangentially merge into each other in a contour-less way, the circles having a first radius of gyration and a second radius of gyration. The center of circle for the first radius of gyration is located below the summit and the center of circle for the second radius of gyration is located below the center of the circle of the first radius of gyration seen in radial direction, wherein the first radius of gyration is smaller than the second radius of gyration.

This may have the advantage that a highly efficient cutting geometry can be provided which allows for a manual operation of the tool in a very effective way. Especially the use of the arc shape described above allows for providing an optimal trade-off between material removal, manageability and the conveying of material to the side of the work piece.

For example the distance between the centers of circle of the first radius of gyration and the second radius of gyration seen in radial direction of the tool may be between 0.5 or 0.7 fold the difference between the first and the second radius of gyration. This allows for working very steadily as a result of the slight curvature of the sprockets.

In accordance with an embodiment of the disclosure the sprockets extend in radial direction of the tool from the head end over the front edge of the tool only up to the 0.5 fold distance between the centers of circle of the first and second radius of gyration seen in radial direction of the tool. This may have the advantage that even with minimal material consumption of the tool it is possible to conduct the material removal in a manually-operated manner and to convey cut off material to the side. Even if the tool is deeply immersed into the work piece primarily the head end of the tool operates to effect the material removal. The front edge discharges the material and if necessary broadens the channel created by the removal of material. Because of the abdication of a further extension of the sprockets beyond 0.5 fold the distance seen in radial direction of the tool, this mode of operation is not affected. In contrast thereto this mode of operation is supported as the tool becomes lighter and as a result can be manually operated more easily.

In accordance with the disclosure the ratio between the second and the first radius of gyration is between 14 and 17. This special choice of ratios of the radiuses may have the effect that an especially high quietness during material removal can be provided. After immersion of the tool into the work piece an optimal compromise between material removal on the head end of the tool as well as on the front edge of the tool is a result of this choice. This may further have the effect that the heat build up created by the material removal at the tool is distributed equally. This increases the longevity of the tool.

In some embodiments of the disclosure the sprockets located at the head end of the tool are curved in radial direction meaning that they are designed with a twist. This may support the conveying of the cut off material to the side such that the tool may continuously remove material without being hindered. As a result no contaminations will be left in the channel created by the material removal which simplifies the subsequent processing of the channel for example by welded or filling.

In some embodiments of the disclosure the curvature extends from the head end over the front edge, wherein the curvature is preferably constant from the head end over the front edge. This may allow for keeping the efficiency of the described material removal on a constant level independently of the depth of immersion of the tool into the work piece. The cutting speed of the tool is thus nearly constant independent of the depth of immersion.

In some embodiments of the disclosure the tool is designed for opening a welded joint. Because of the special material hardness of welded joints and the necessary precision in tool guidance when opening a welded joint the described tool may be especially suited for this kind of work. Despite the material hardness the tool uniformly removes the material due to its cutting geometry and still provides a very high level of quietness during operation such that even a manual operation is possible. Further the arc shape of the tool results in a channel in the processed work piece which can be welded up subsequently in a very easy way.

In accordance with an embodiment of the disclosure the tool is formed integrally. As a result it can be manufactured in a cost-efficient fashion and the mechanical duration is increased.

In a further aspect the disclosure relates to the use of the tool described above for application with hand tools or with chip-cutting machines.

In some embodiments of the disclosure the application is the opening of a welded joint.

In the following similar elements are denoted with the same reference numerals.

FIG. 1 shows a perspective view of a tool 100 having driving means 102 like for example a manually operable angle grinding machine. The driving means 102 rotatably drives the tool 100 using a shaft 104. Using sprockets 106 of the tool 100 the tool 100 is operable to conduct a material removal from a work piece. The tool 100 has a ring-shaped form wherein the sprockets 106 are arranged along the circumference of the tool 100.

Figure 2:
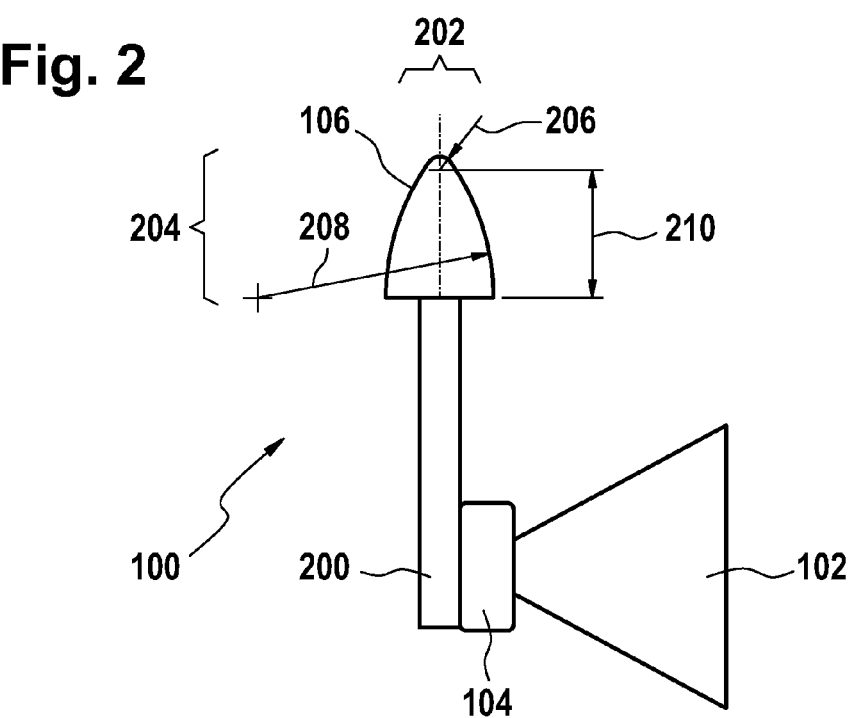
FIG. 2 is a schematic cross-section view of a tool having driving means.

FIG. 2 shows a schematic cross-section view of the tool 100 shown in FIG. 1 wherein it is now apparent that the shaft 104 is mounted to a mounting area 200 of the tool 100. Further the cross-section view of FIG. 2 shows the cross-section of a single sprocket 106 wherein the sprocket 106 extends at least partially from the head end 202 over the front edge 204 of the tool 100. Seen in axial ring-direction (that is from left to right in FIG. 2) the sprocket 106 has an arc-shaped form having a summit and is mirror-symmetric relative to the ring surface of the tool 100 which runs through the summit. As a result the sprockets 106 are formed on both sides of the tool 100 while the sprockets on the left side have a right hand twist and are right hand cutting while the sprockets 106 on the right side, which is facing towards the driving means, have a left hand twist and are left hand cutting.

The arc shape can be described in FIG. 2 by two circles which merge into each other in a contourless tangential way. However, it is also possible that a parabolic form may be used in this context as an alternative or in addition. The arc shape described with those two circles can be defined by two radius of gyration that is the first radius 206 and the second radius 208. Given by the ratio of a factor 15 between both the radii the tool 100 has a very high quietness when running for conducting a removal of material.

As is further illustrated in FIG. 2 the sprocket 106 only extends approximately to the center of the circle of the second radius 208 on the front edge 204. Seen in radial direction of the tool 100 the distance 210 between the center of circle of the first and second radius of gyration is approximately 0.6 fold the difference between the first and the second radius of gyration.

Figure 3:
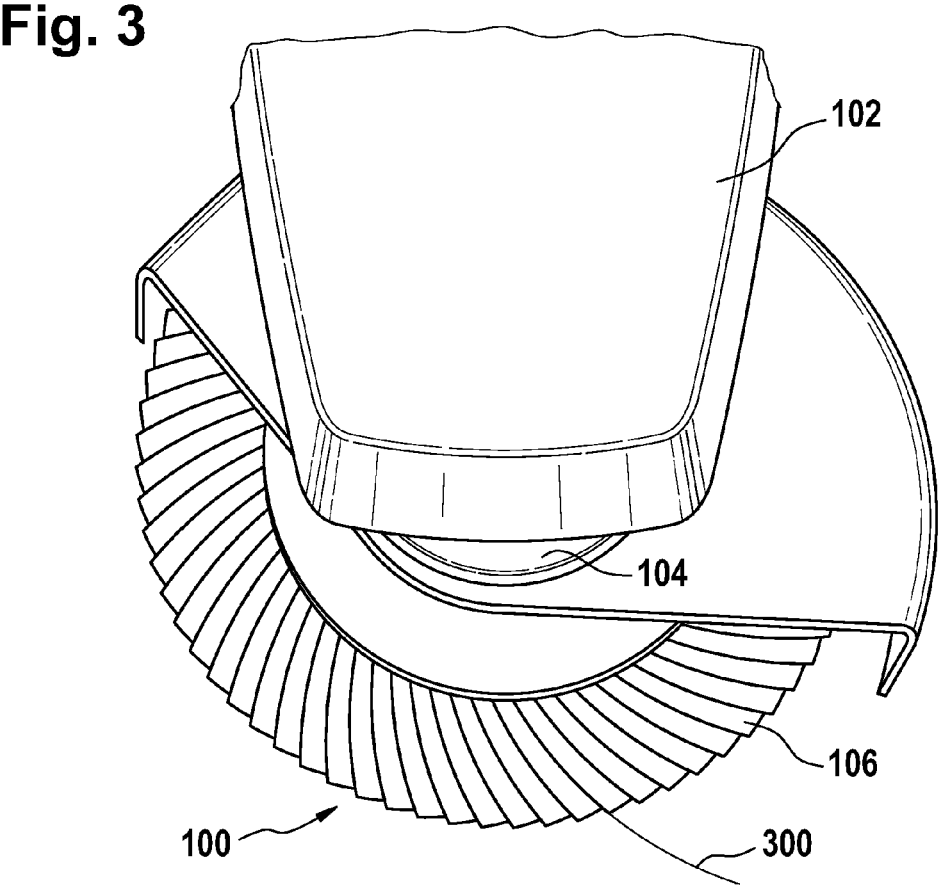
FIG. 3 is a perspective side view of a tool having driving means.

FIG. 3 shows a perspective side view of the tool 100 making it apparent that the sprockets 106 are curved from the head end 202 of the tool 100 seen in radial direction and that the curvature 300 extends from the head end 202 over the front edge 204. This serves the efficient removal of material when using the tool 100 for cutting applications. This results in an increased quietness when running the tool 100. This may further be increased by the fact that along the curvature 300 the sprockets 106 are interrupted in a continuous or uncontinuous way.

To find an optimal compromise between manual operability of the tool 100, quietness during operation and efficiency of material removal for example when processing aluminum the cutting angle could be −20° the clearance angle +10° and the twist 30°. Preferably the sprockets 106 are made of tungsten carbide.

Figure 4A:
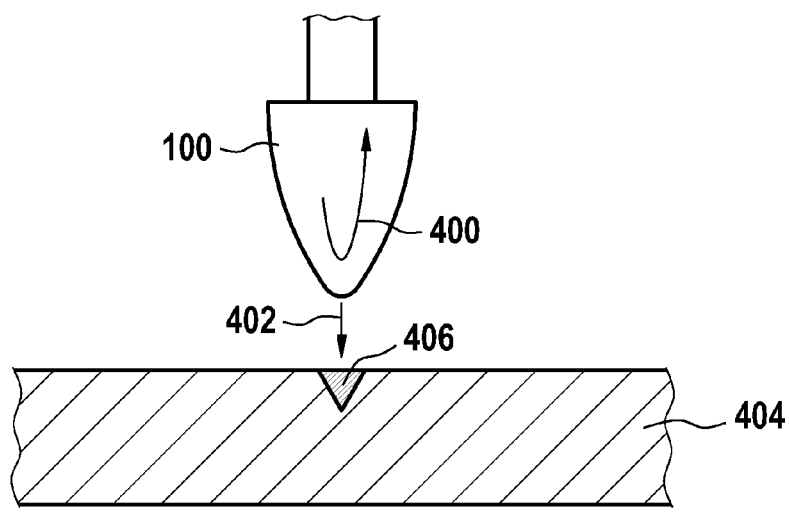
FIG. 4 is a schematic view of a method for processing a work piece.

FIG. 4a shows a work piece 404 having a welded joint 406. The tool 100 now serves to open the welded joint 406 that is the welded root, the tool being set into rotatory motion towards direction 400 by a driving entity not shown here. The tool 100 is set onto the welded joint 406 in direction 402 and then continuously removes material.

Figure 4B:
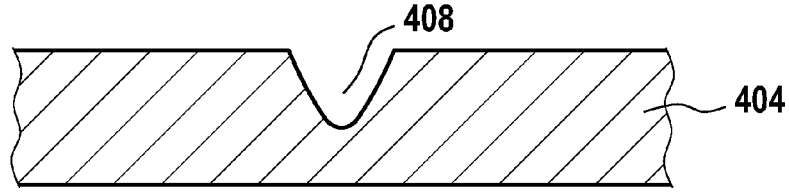

The result is shown in FIG. 4b wherein the created channel 408 shows the sprocket shape of the tool 100. The channel 408 may now be welded again or may be filled with other material.

Some aspects and features of the disclosed embodiments are set out in the following numbered items:

1. Ring-shaped tool (100) for processing a work piece, wherein the tool (100) has a fastening area (200) for fastening onto a rotatable drive shaft (104), wherein the fastening area (200) is centered with relation to the ring-shape of the tool (100), wherein the tool further has sprockets (106) arranged around the circumference of the tool (100), wherein the sprockets (106) are arranged on the head end (202) of the tool (100), wherein the sprockets (106) have an arc-shape seen in axial direction of the ring, the arc-shape having a summit, wherein the sprockets (106) are formed in a mirror-symmetric manner relative to the ring surface of the tool (100) which is cutting through the summit, wherein the arc-shape is given by two circles which tangentially merge into each other in a contour-less way, the circles having a first radius of gyration (206) and a second radius of gyration (208), wherein the center of circle for the first radius of gyration is located below the summit and wherein the center of circle for the second radius of gyration (208) is located below the center of the circle having the first radius of gyration (206) seen in radial direction, wherein the first radius of gyration (206) is smaller than the second radius of gyration (208), wherein the ratio between the second (208) and the first (206) radius of gyration is between 14 and 17.

2. Tool (100) in accordance with claim 1, wherein the sprockets extend at least partially from the head end (202) of the tool (100) over the front edge (204) of the tool (100).

3. Tool (100) in accordance with claim 1, wherein the distance (210) between the centers of circle of the first radius of gyration (206) and the second radius of gyration (208) seen in radial direction of the tool (100) is between 0.5 and 0.7 fold the difference between the first (206) and the second (208) radius of gyration.

4. Tool (100) in accordance with claim 1 or 3, wherein the sprockets (106) extend in radial direction of the tool (100) from the head end (202) over the front edge (204) of the tool (100) only up to the 0.5 fold distance (210) between the centers of circle of the first (206) and the second (208) radius of gyration seen in radial direction of the tool (100).

5. Tool (100) in accordance with any of the preceding claims, wherein the sprockets (106) located at the head end (202) of the tool (100) are curved in radial direction.

6. Tool (100) in accordance with claim 5, wherein the curvature extends from the head end (202) over the front edge (204).

7. Tool (100) in accordance with claim 6, wherein the curvature is constant from the head end (202) over the front edge (204).

8. Tool (100) in accordance with any of the preceding claims, wherein the tool (100) is designed for opening a welded joint (406).

9. Tool (100) in accordance with any of the preceding claims, wherein the tool (100) is formed integrally.

10. Use of the tool (100) in accordance with any of the preceding claims for application with hand tools or with chip-cutting machines.

11. Use as described in claim 10, wherein the application is the opening of a welded joint (406).

LIST OF REFERENCE NUMERALS

| | |
|---|---|
| 100 | tool |
| 102 | driving means |
| 104 | shaft |
| 106 | sprockets |
| 200 | mounting area |
| 202 | head end |
| 204 | front edge |
| 206 | first radius |
| 208 | second radius |
| 210 | distance |
| 300 | curvature |
| 404 | work piece |
| 406 | welded joint |
| 408 | channel |

What is claimed is:

1. A ring-shaped tool for processing a work piece, comprising:
a fastening area for fastening onto a rotatable drive shaft, wherein the fastening area is centered with relation to the ring-shape of the tool; and
a plurality of sprockets arranged around the circumference of the tool to form a ring in a first plane, the ring having an axis of rotation that defines an axial direction, wherein the plurality of sprockets are arranged on the head end of the tool and, when viewed from a direction perpendicular to the axial direction, each sprocket of the plurality of sprockets has an arc-shape the arc-shape having a summit that lies in the first plane, wherein the sprockets are formed in a mirror-symmetric manner relative to the first plane, and wherein, when viewed from the axial direction, each sprocket of the plurality of sprockets has a curvature in a radial direction;
wherein the arc-shape comprises first and second circular arcs which merge into each other at a point of common tangent, the first circular arc forming the summit of the arc-shape and having a first radius of gyration and the second circular arc having a second radius of gyration, wherein the center of circle for the first radius of gyration is located closer to the axis than is the summit and wherein the center of circle for the second radius of gyration is located closer to the axis than is the center of the circle having the first radius of gyration, wherein the second radius of gyration is at least 14 times the first radius of gyration and is no greater than 17 times the first radius of gyration.

2. A tool in accordance with claim 1, wherein the sprockets extend at least partially from the head end of the tool over the front edge of the tool.

3. A tool in accordance with claim 1, wherein the distance between the centers of circle of the first radius of gyration and the second radius of gyration in a radial direction of the tool is between 0.5 and 0.7 fold the difference between the first radius of gyration and the second radius of gyration.

4. A tool in accordance with claim 1, wherein the sprockets extend in a radial direction of the tool from the head end over the front edge of the tool only up to the 0.5 fold distance between the centers of circle of the first and the second radius of gyration in a radial direction of the tool.

5. A tool in accordance with claim 1, wherein, when viewed from the axial direction, the curvature in the radial direction extends from the head end over the front edge.

6. A tool in accordance with claim 5, wherein, when viewed from the axial direction, the curvature in the radial direction is constant from the head end over the front edge.

7. A tool in accordance with claim 1, wherein the tool is designed for opening a welded joint.

8. A tool in accordance with claim 1, wherein the tool is formed integrally.

9. A tool in accordance with claim 1, configured for application with hand tools or with chip-cutting machines.

10. A tool in accordance with claim 9, configured for opening of a welded joint.

11. A ring-shaped tool for processing a work piece, comprising:
a fastening area for fastening onto a rotatable drive shaft, wherein the fastening area is centered with relation to the ring-shape of the tool and has an axis of rotation that defines an axial direction; and a plurality of sprockets arranged around the circumference of the tool to form a ring in a first plane, wherein the plurality of sprockets are arranged on the head end of the tool and, when viewed from a direction perpendicular to the axial direction, each sprocket of the plurality of sprockets has an arc-shape, the arc-shape having a summit that lies in the first plane, wherein the sprockets are formed in a mirror-symmetric manner relative to the first plane, and wherein, when viewed from the axial direction, each sprocket of the plurality of sprockets has a curvature in a radial direction of the ring-shaped tool;

where the arc-shape has a greater curvature at its summit than at first and second locations either side of the summit; and where the arc-shape has a continuous tangent.

12. The ring-shaped tool of claim 11, where the arc-shape comprises a parabola.

13. The ring-shaped tool of claim 11, where the arc-shape comprises a plurality of circular arcs.

14. The ring-shaped tool of claim 11, where, when viewed from the axial direction, the curvature in the radial direction is constant.

15. The ring-shaped tool of claim 11, where the curvature of the arc-shape at the summit is at least 14 times the curvature at the first and second locations and is no greater than 17 times the curvature at the first and second locations.

* * * * *